UNITED STATES PATENT OFFICE.

OSCAR BALLY AND HUGO WOLFF, OF MANNHEIM, GERMANY, ASSIGNOR TO BADISCHE ANILIN & SODA FABRIK, OF LUDWIGSHAFEN-ON-THE-RHINE, GERMANY, A CORPORATION.

YELLOWISH-BROWN VAT DYE.

1,216,921.     Specification of Letters Patent.     Patented Feb. 20, 1917.

No Drawing. Original application filed December 9, 1911, Serial No. 664,865. Divided and this application filed January 23, 1915. Serial No. 4,030.

*To all whom it may concern:*

Be it known that we, OSCAR BALLY and HUGO WOLFF, respectively citizen of the Swiss Republic and subject of the Grand Duke of Baden, residing at Mannheim, Germany, have invented new and useful Improvements in Yellowish-Brown Vat Dyes, of which the following is a specification.

The specification of Patent No. 1,016,604 describes the manufacture of coloring matters by condensing halogenated ketones and diketones, such for instance as benzophenone, benzil and phenanthraquinone, with amino compounds of the anthracene series, whereby coloring matters are obtained which dye cotton, from the vat, from red to violet-brown shades. Similar coloring matters can be obtained by condensing halogen derivatives of di-aryl-sulfones with amino-anthraquinones, and also by condensing halogenated di-aryl-methane derivatives or halogenated fluorenone derivatives with amino-anthraquinones.

We have now found that the condensation product obtainable from the dihalogenfluorenone and two molecular proportions of 1-amino-anthraquinone, on being treated with a dehydrating agent, can be converted into a new coloring matter which dyes on cotton from a vat fast yellowish brown shades. It is possible that during the reaction the elements of water are removed and inner condensation takes place, so that arcidin rings are formed. Thus the formation of coloring matter can probably be represented by the following formulæ:—

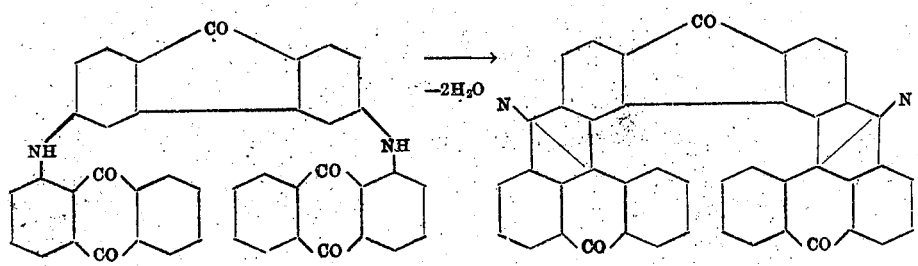

Our new coloring matter consists when dry, of a brown powder which yields a red-brown solution in concentrated sulfuric acid and a brown solution in 23% fuming sulfuric acid. It yields a red-brown vat in alkali hydrosulfite solution and from this vat colors cotton red-brown shades which, upon washing and drying, become very fast yellowish brown.

The following example will serve to illustrate further the nature of our invention, which, however, is not confined to this example. The parts are by weight.

Heat together, at from 160° to 165° C., 25 parts of the condensation product from dibrom-fluorenone (see *Berichte* 38, 3765) and 1-amino-anthraquinone, and 375 parts of 97% sulfuric acid, until a test portion shows that the reaction is complete. Pour the melt into water, boil, filter off and wash and dry the product which can be freed from any sulfonic acid by boiling it with dilute caustic soda solution. The coloring matter, which is thus obtained in the form of a brown powder, yields a red-brown solution in concentrated sulfuric acid and a brown solution in 23% fuming sulfuric acid. With alkali hydrosulfite, it yields a red-brown vat and, from this vat, cotton is colored red-brown shades which, upon washing and drying, become very fast yellowinsh brown.

Now what we claim is:—

The new coloring matter of the anthracene series which can be obtained by heating with sulfuric acid the condensation product from dibrom-fluorenone and 1-amino-anthraquinone, which new coloring matter probably possesses a constitution corresponding to the formula

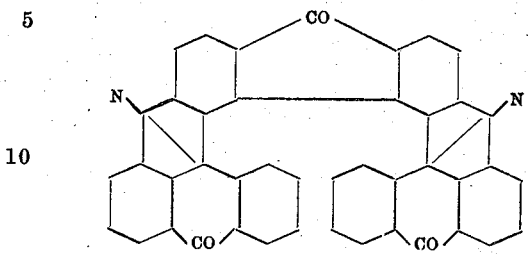

and which consists, when dry, of a brown powder which yields a red-brown solution in concentrated sulfuric acid and a brown solution in 23% fuming sulfuric acid, which yields a red-brown vat in alkali hydrosulfite solution and from this vat colors cotton red-brown shades which, upon washing and drying, become very fast yellowish brown.

In testimony whereof we have hereunto set our hands in the presence of two subscribing witnesses.

OSCAR BALLY.
HUGO WOLFF.

Witnesses:
ARTHUR DENONVILLE,
W. ERNST.